A. H. BRADLEY.
ICE BREAKING, SALTING, AND FEEDING MACHINE.
APPLICATION FILED MAY 29, 1915.

1,208,469.

Patented Dec. 12, 1916.
2 SHEETS—SHEET 1.

Inventor,
Andrew H. Bradley.
By Victor J. Evans,
Attorney.

Witnesses:

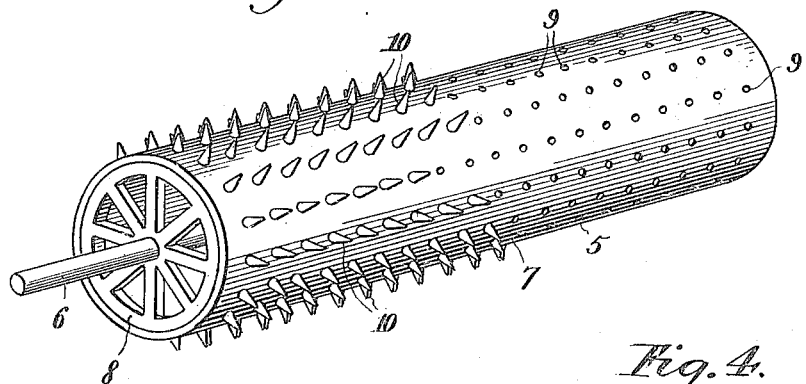
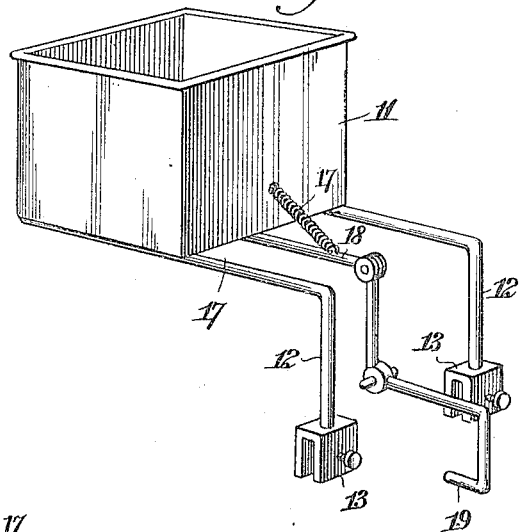
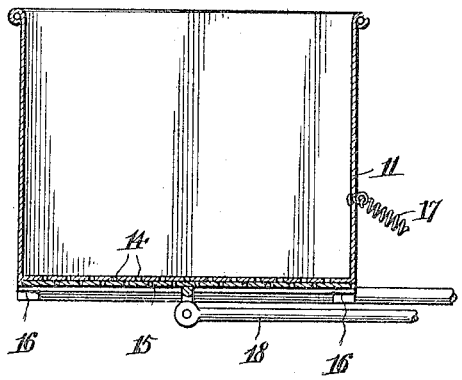

UNITED STATES PATENT OFFICE.

ANDREW H. BRADLEY, OF KANSAS CITY, MISSOURI.

ICE BREAKING, SALTING, AND FEEDING MACHINE.

1,208,469.

Specification of Letters Patent.

Patented Dec. 12, 1916.

Application filed May 29, 1915. Serial No. 31,205.

*To all whom it may concern:*

Be it known that I, ANDREW H. BRADLEY, a citizen of the United States, residing at Kansas City, in the county of Jackson and State of Missouri, have invented new and useful Improvements in Ice Breaking, Salting, and Feeding Machines, of which the following is a specification.

This invention relates to ice breaking, salting and feeding machines, the object in view being to provide a machine which may be manufactured cheaply and which is adapted to be used in conjunction with an ice cream freezer or like article, the said machine being adapted to drive said freezer to break up a block of ice, to supply salt to the broken ice and to feed the salted ice to the freezer in accordance with requirements.

With the above and other objects in view, the invention consists in the novel construction, combination and arrangement of parts, as herein described, illustrated and claimed.

Figure 1:
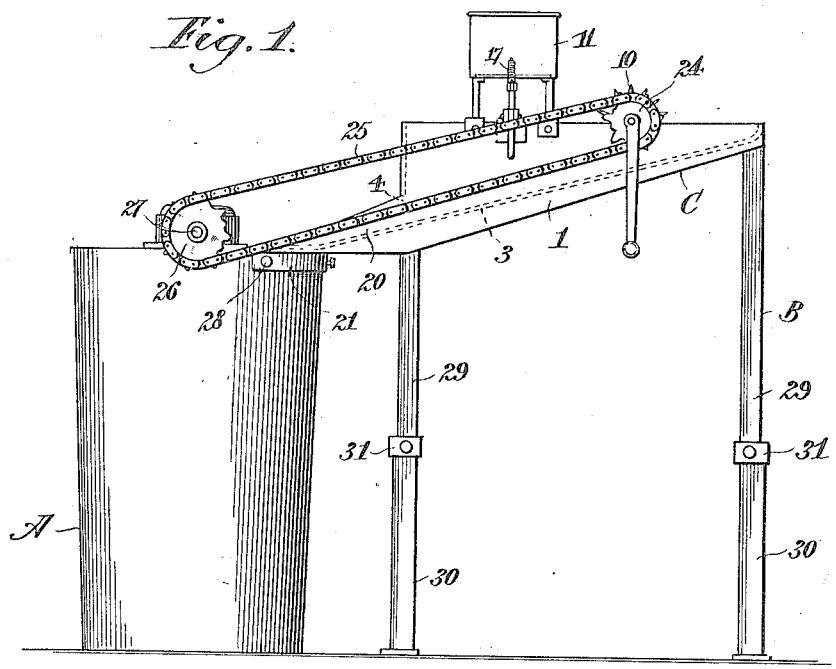
Figure 2:
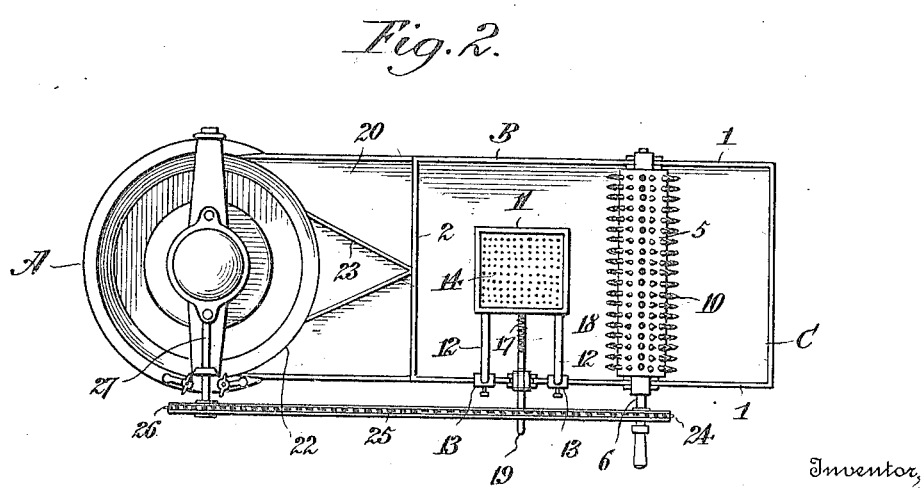

In the accompanying drawings:—Figure 1 is a side elevation of an ice cream freezer showing the machine of this invention applied thereto and used in conjunction therewith. Fig. 2 is a plan view of the same. Fig. 3 is a detail perspective view of the ice breaking cylinder, omitting some of the teeth thereof. Fig. 4 is a detail perspective view of the salt receptacle. Fig. 5 is a cross section through the same.

Referring to the drawings A designates an ice cream freezer and B generally designates the machine of this invention.

In the preferred embodiment of this invention, the machine comprises an elevated trough designated generally at C and comprising the substantially triangular sides 1, connecting end wall 2, and inclined bottom 3 which slopes toward the discharge end of the machine, the end wall 2 terminating at its bottom edge sufficiently above the inclined bottom 3 to leave a discharge orifice 4 for the ice or salt or the salted ice.

Journaled in the side walls 1 of the elevated trough C is an ice breaking cylinder 5, the shaft 6 of which projects beyond one of the side walls 1 where it is provided with an operating crank adapted to be turned by hand. It may be stated at this point, however, that the cylinder may be power driven if so desired.

By reference to Fig. 3, it will be observed that in the preferred embodiment of this invention the cylindrical working surface or main body 7 of the cylinder is of hollow or tubular form and connected by spiders or heads 8 to the shaft 6. The body is formed with a large number of holes 9 each of which is adapted to receive an ice breaking pick or tooth 10 which may be screwed or otherwise fastened in its respective hole 9 in the cylinder. This enables teeth of different sizes and shapes to be fastened to the cylinder and, if desired, a comparatively small or large number of teeth may be removed for varying the size of the pieces of ice, the fewer the teeth, the larger will be the pieces, provided all of the teeth are not removed. If all of the teeth are in, the cylinder with all the teeth applied thereto will operate to very finely comminute or shave the ice when used for other purposes than freezing such, for example, as to cool drinks of all kinds.

The space between the cylinder 5 and the shallower portion of the trough defined by the upper portion of the inclined floor 3 is intended to receive a block of ice, the inclined floor 3 causing said block of ice to rest in contact with the cylinder 5 so that the teeth thereof will constantly work in contact with the block of ice, the teeth serving to gouge and remove chucks of ice from the block, the removed portions or pieces of ice being of course determined by the number of teeth on the cylinder 5.

11 designates a salt receptacle which is provided with supporting legs 12 having terminal clamps 13 at their lower ends adapted to embrace the top edge of one of the sides 1 of the trough upon which the salt receptacle 11 is clamped as clearly illustrated. The bottom of the salt receptacle is reticulated as shown at 14 to allow the salt to gravitate therefrom upon the ice in the lower or deeper portion of the trough C after it has been broken up by the cylinder 5. Operating in parallel relation to the reticulated bottom of the salt receptacle is a reciprocatory gate 15 mounted in suitable guide ways 16 on the bottom of said receptacle, said gate being provided with openings adapted to register with those in the bottom 14 and gate 15 being held normally closed to prevent the discharge of the salt by means of a spring 17. The gate 15 is operated by means of an arm 18 having a hook shaped end portion 19 which is adapted to be engaged by the operating crank 6 of the cylinder 5. In each complete revolution of the crank 6, the latter comes in contact with the operating arm 19 of the gate 15 thereby momentarily opening the same and permitting the salt to sprinkle upon the ice beneath as the latter gravitates downwardly along the inclined floor 3 of the elevated trough.

At the discharge end of the floor 3 is arranged a delivery shelf 20 provided with a flexible attaching flange 21 adapted to fit a freezer of any diameter. The projecting edge of the shelf 21 is curved as shown at 22 to conform to the curvature of the freezer A and is also provided with a raised V-shaped deflector 23 which operates to distribute the broken ice and cause the same to be deposited in the tub of the freezer and around the revolving cream holding can thereof. In order to drive the ice cream freezer, a sprocket wheel 24 is fastened upon the shaft 6 of the cylinder 5 and a sprocket chain 25 is run therefrom around another sprocket wheel 26 on the operating shaft 27 of the freezer. The freezer is made fast in relation to the machine above described by means of one or more clamps 28 thus preserving a fixed relation between the actuating machine and the freezer.

In order to accommodate the machine to freezers or other articles of different heights, the trough C is mounted upon supporting legs 29 having vertically adjustable lower portions or extensions 30 which are connected to the upper fixed portions by means of clamps 31. This provides for raising and lowering the trough C in order to bring the delivery shelf 20 into the proper relation to the freezer A to insure the discharge of the broken ice into the tub of the freezer.

The salt receptacle may be detached from the trough when not needed and after a sufficient supply of ice has been broken and delivered to the freezer, the ice breaking operation may be suspended by removing the block of ice from the trough. The machine as a whole provides for breaking up a block of ice, delivering the same to the freezer and salting the ice between the time it leaves the breaking cylinder and the time it reaches the distributing shelf. The machine as a whole may be manufactured at small cost and will be found of great convenience in stores, hotels and other places where ice cream is served in large quantities and will also be found useful to the housekeeper who, as a general rule, is not provided with facilities for breaking up and preparing ice for freezing purposes.

What I claim is:—

1. The combination of a machine frame, embodying an elevated trough having an inclined floor arranged to discharge at one side of the machine, supporting means for said trough, a rotary ice breaking cylinder extending across said trough, a crank for operating said cylinder, a salt receptacle positioned over said trough, a movable feed gate for said receptacle, and gate-operating means in the path of movement of and actuated by the crank of the ice breaking cylinder.

2. The combination of a machine frame, embodying an elevated trough having an inclined floor arranged to discharge at one side of the machine, and supporting means for said trough, a rotary ice breaking cylinder extending across said trough and parallel to said inclined floor so as to leave a wedge-shaped space for a block of ice, operating means for said cylinder, a salt receptacle positioned over said trough, a movable feed gate for said receptacle, means actuated by the crank of the ice breaking cylinder for imparting motion to said feed gate, a delivery shelf on which the ice is discharged provided with distributing means, and chain and sprocket mechanism actuated by the shaft of said ice breaking cylinder for operating an ice cream freezer or the like.

In testimony whereof I affix my signature in presence of two witnesses.

ANDREW H. BRADLEY.

Witnesses:
HARRY O. BOLING,
WALTER S. WOLFSON.

Copies of this patent may be obtained for five cents each, by addressing the "Commissioner of Patents, Washington, D. C."